3,284,302
STEROID COMPOSITIONS AND METHOD OF
USING SAME
Fred A. Kincl, Mexico City, Mexico, assignor to Syntex Corporation, Panama, Panama, a corporation of Panama
No Drawing. Filed Jan. 17, 1963, Ser. No. 252,028
12 Claims. (Cl. 167—74)

The present invention relates to novel hormonal pharmaceutical compositions possessing progestational and anti-estrogenic activity and to the process of administration of the same, to animals.

More particularly the present invention relates to certain novel pharmaceutical compositions including 17α-acyloxy-pregnenolone compounds and to the process of administration of such compositions in the animal clinic.

The novel pharmaceutical compositions of the present invention include the compounds represented by the following formula:

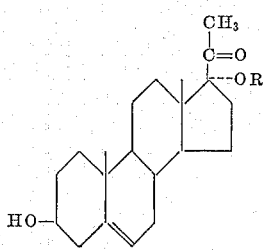

In the above formula R represents an acyl group derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butyl-acetate, phenoxyacetate, cyclopentylpropionate, aminoacetate, and β-chloropropionate.

In accordance with the present invention, the surprising discovery has been made that the compounds represented by the above formula are very potent anti-estrogenic and progestational agents useful in control of fertility, and have remarkable activity when administered by the oral route, thus greatly simplifying the treatment of patients who are in a state of enhanced sensitiveness and mental agitation and often exhibit exaggerated reluctance to parenteral treatment.

In accordance with the present invention, the oral activity of the above compounds facilitates the administration of progestational agents in cases where parenteral treatment of each individual is difficult; for example, when control of moulting in poultry is desired, the feed may be fixed with a compound represented by the above formula, thus assuring a uniform distribution among all animals. The compounds are also useful for the control of female dogs so as to prevent heat during dog shows and field trials.

Compositions containing 17α-acyloxy-pregnenolone compounds are useful in the treatment of diseases associated with the increase of estrogens in the female, and of disorders caused by progestational deficiency.

The administration of such compositions in precise doses contained in conventional unit dosage types is convenient for strict control of the amounts of active substance and enables variation or alternation with placebos for diagnostic observation.

The "unit dosages" referred to hereinbefore, are pharmaceutical forms containing a certain amount of active material necessary to produce a desired therapeutic effect.

Examples of unit dosages in solid form are: tablets, capsules, pills, powder packets, laminated pills or tablets and the like.

In the case of liquid compositions for oral administration such as solutions, emulsions, syrups, etc., the "unit dosage" is a teaspoonful or a tablespoonful.

In the case of liquid compositions for administration by injection such as solutions, microcrystalline suspensions, etc., the "unit dosage" is 1 cc.

The 17 α-acyloxy derivatives of pregnenolone may be employed alone or in mixtures with other coacting compounds. They may be associated with solid or liquid carriers, in solutions, dispersions or suspensions.

For preparing solid compositions, e.g. tablets, there may be included conventional tableting ingredients, such as corn starch, lactose, talc, stearic acid, magnesium stearate, calcium, stearate, gums and the like. Any other compatible, edible, tableting material used in pharmaceutical practice may be employed.

The novel compositions of the present invention may also include the active material in the form of laminated or coated tablets or pills, e.g. the active hormone may be be contained in the core of the pill or tablet enveloped by a layer which may include hormones with similar or different activities or other substances such as analgesics, sedatives or anti-spasmodics. Moreover, the layers may be separated by an additional enteric layer, made of conventional materials such as mixtures containing shellac and edible substances, cellulose phthalate, starch and amylose acetate phthalate, and the like, thus making possible the absorption of the outer coating in the stomach and the core in the duodenum. This form of administration enables a more prolonged absorption period if active hormone is included in the outer and inner portions of the pill or tablet.

The oral liquid forms include aqueous solutions, syrups, suspensions, emulsions with edible oils such as cotton seed oil, sesame oil, coconut oil, peanut oil and other vegetable oils. As emulsifying agents, there are included the natural and synthetic gums such as tragacanth gum, acacia, gelatines, dextrine, sodium carboxymethyl cellulose, polyethylene glycol, polyvinylpyrrolidone, etc.

The injectable liquid forms include oil solutions, microcrystalline suspensions, and emulsions. The vehicles of these forms may be water, aqueous solutions used conventionally in pharmacy or edible oils such as sesame oil, coconut oil and the like. In addition, they may also include bacteriostatic agents, e.g. benzyl alcohol, preservatives, as for example, ethylparaben, propylparaben, etc., and emulsifying agents of similar types as those included in the oral liquid forms.

The preferred compositions in accordance with the present invention are those prepared for administration in unit dosage form.

In accordance with the present invention the surprising discovery has been made that the introduction of a 17α-acyloxy grouping into the pregnenolone molecule enhances remarkably its progestational and anti-estrogenic activities, especially when administered orally. For example, 17α-acetoxy-pregnenolone is 3 to 4 times more active orally than 17α-acetoxyprogesterone which is a known oral progestational agent.

Derivatives with higher 17α-acyloxy groups such as 17α-acyloxy-pregnenolone may be used for prolonged action compositions. Mixtures of lower and higher 17α-acyloxy-pregnenolones furnish suitable active hormone compositions with both immediate and prolonged actions.

In female animals, such as domestic female animals, the convenient oral unit dosage is of 0.5 to 10 mg. daily per kilogram of body weight.

When parental treatment is desired, the suitable dose in animals such as domestic animals, is approximately 0.01 to 0.2 mg. daily per kilogram of body weight. In this case also higher or lower doses may be administered, depending upon the individual response, severity of illness, etc.

Conventional acylation of the compounds represented by the formula indicated hereinbefore, produced the corresponding 3β-acyloxy derivatives, which may also be used as progestational agents in the form of pharmaceutical compositions similar to the ones described herein.

The following specific examples serve to illustrate but are not intended to limit the scope of the present invention:

Example I

Pharmaceutical preparation containing 17α-acetoxy-pregnenolone in the form of tablets.

One thousand tablets, each containing approximately 10 mg. of 17α-acetoxy-pregnenolone are prepared from the following types and amounts of materials:

|  | G. |
|---|---|
| 17α-acetoxy-pregnenolone | 10.25 |
| Lactose, U.S.P. | 93.00 |
| Polyvinylpyrrolidone | 6.00 |
| Corn starch, U.S.P. | 44.00 |
| Magnesium stearate, U.S.P. | 7.00 |
|  | 150.25 |

The finely powdered 17α-acetoxy-pregnenolone, lactose, polyvinylpyrrolidone and corn starch are mixed well, preferably with trituration, till an homogeneous powder is formed. This powder is moistened with 37 cc. of ethanol and the humid mixture is passed through a 8 or 10 sifter, thereafter being granulated by usual procedures. The granules are dried at 50° C. for 4.5 hours, then mixed with magnesium stearate and the final mixture is compressed into 150 mg. tablets containing approximately 10 mg. of active substance.

In the same manner there are prepared tablets with 17α-caproxy-pregnenolone as active hormone (obtained from 17α-hydroxy-pregnenolone by conventional acylation with caproic anhydride in the presence of p-toluenesulfonic acid, and selective saponification of the 3-caproxy group of the produced dicaproates with potassium carbonate in methanol at reflux temperature for 1 hour).

Example II

The method described in the foregoing example for preparing tablets with 10 mg. of active material was repeated, but there were only added 5 mg. of 17α-acetoxy-pregnenolone for each tablet, i.e. 5 g. for each thousand tablets.

Example III

Pharmaceutical preparation containing 17α-acetoxy-pregnenolone in the form of tablets.

One thousand tablets containing each approximately 5 mg. of 17α-acetoxy-pregnenolone are prepared as follows.

Materials: G.
- 17α-acetoxy-pregnenolone _____ 5
- Lactose _____ 60
- Colloidal silicic acid with hydrolyzed starch _____ 20
- Wheat starch _____ 41
- Arrow-root _____ 15
- Magnesium stearate _____ 2
- Talc _____ 3

*Preparation.*—The 17α-acetoxy-pregnenolone is triturated with the lactose to form an homogeneous powder. In a mixing machine, there is placed the above mixture and there is added the silicic acid, hydrolyzed starch, wheat starch and water until an homogeneous paste is formed, which is dried and granulated by the usual method. The dry granulated is pressed with arrow-root (as disintegrating agent), magnesium stearate and talc (as lubricants) to form in this manner tablets containing approximately 5 mg. of active substance. 1 to 3 tablets given one to three times every 24 hours is sufficient to produce good progestational activity.

Example IV

Pharmaceutical preparation containing 17α-acetoxy-pregnenolone in gelatine capsules.

Formula for one thousand capsules:

| | |
|---|---|
| Starch or any other vehicle | 25 |
| 17α-acetoxy-pregnenolone | 15 |

The capsules are prepared in the conventional manner, first mixing the finely divided powder of the active material with vehicles (starch, talc, stearic acid or magnesium stearate) and then encapsulating. There are thus obtained capsules containing approximately 15 mg. of 17α-acetoxy-pregnenolone. They are employed in the clinic with good results in cases of dysmenorrhea.

Example V

Pharmaceutical preparation containing 17α-acetoxy-pregnenolone as aqueous suspension.

An aqueous suspension for oral use containing in 5 ml. (approximately one teaspoonful) 10 mg. of 17α-acetoxy-pregnenolone is prepared in the following manner:

| | | |
|---|---|---|
| 17α-acetoxy-pregnenolone | g | 2 |
| Citric acid, U.S.P. | g | 2 |
| Benzoic acid, U.S.P. | g | 1 |
| Methyl-paraben, U.S.P. | g | 2 |
| Propyl-paraben, U.S.P. | g | 0.5 |
| Glycerol, U.S.P. | ml | 150 |
| Powdered tragacanth gum | g | 7.5 |
| Flavoring essential oil | ml | 0.2 |
| Sucrose | g | 400 |
| Distilled water, sufficient for 1000 ml. | | |

The citric acid is dissolved in 500 ml. of water. In another container, there is placed the glycerol and there are added the benzoic acid and the parabens and then the 17α-acetoxy-pregnenolone finely powdered, and then the tragacanth gum and the essential oil in the indicated order. After grinding until an homogeneous mass is obtained, there is added the aqueous solution with vigorous stirring. Finally the sucrose is added and the resulting mixture is perfectly stirred in a colloidal mill until an homogeneous suspension is obtained.

The rest of the water is then added to complete 1000 ml.

From 1 to 2 teaspoonful taken daily produce a favorable effect in the treatment of amenorrhea.

Example VI

Pharmaceutical composition containing 17α-caproxy-pregnenolone in the form of injectable oil solution.

1 cc. contains: Mg.
| | |
|---|---|
| 17α-caproxy-pregnenolone | 2.5 |
| Propyl - p - hydroxybenzoate (propyl - paraben, U.S.P.) | 1.0 |
| Benzyl alcohol | 104.3 |
| Sesame oil | 805.0 |

*Preparation.*—Place carefully weighed 17α-caproxy-pregnenolone and the propyl-paraben in an adequate container which can be hermetically closed. Add the benzyl alcohol and the sesame oil, sending down the solid particles sticking to the sides of the container. Close hermetically and heat under stirring at 80–90° C. until all dissolves. Cool to 40–50° C. and filter through a Hormon "EOP" ultrafilter (Selas cells of XFF porosity may also be employed). Seal with neoprene stoppers and sterilize at 125° C. in a dry heat oven for 12 hours. Aseptically transfer to adequate containers according to the required doses. Finally sterilize these containers at 125° C. for 12 hours for ampoule bottles, and for 2 hours for ampoules.

The administration of this composition by injection produces a good progestational effect.

*Example VII*

Pharmaceutical composition containing 17α-acetoxy-pregnenolone in the form of injectable micro crystalline suspension.

| Formula for 1000 cc. of suspension: | G. |
|---|---|
| 17α-acetoxy-pregnenolone | 5.250 |
| Sodium carboxymethyl cellulose | 5.000 |
| Sodium chloride | 9.000 |
| Methyl cellulose | 1.000 |
| Sorbitan mono-oleate polyoxyethylene (Tween 80, U.S.P) | 1.900 |
| Methyl p-hydroxybenzoate | 2.400 |
| Propyl p-hydroxybenzoate | 0.260 |
| Distilled water | 968.400 |

*Preparation.*—A solution was obtained by dissolving sodium chloride, methyl p-hydroxybenzoate and propyl-p-hydroxybenzoate in the distilled water, which was then sterilized by filtration. 200 g. of such solution were used to dissolve the methyl cellulose and the sodium carboxymethyl cellulose (Solution B).

Solution B was transferred to a ball mill, the carefully weighed microcrystals of 17α-acetoxy-pregnenolone were added and the mixture sterilized for 1½ hours in an autoclave at 120° C.; after cooling this, Tween 80 was added. The sterile mixture thus obtained was stirred (rotatory stirring) for 48 hours at room temperature and the resulting suspension was quantitatively transferred to a sterile container, then diluting with the rest of solution A (also sterile) and adjusting the pH to 6.8.

Finally it was transferred to 1 cc. ampoules under aseptic conditions. Each cubic centimeter of this injectable suspension contains approximately 5 mg. of 17α-acetoxy-pregnenolone.

The administration of this injectable suspension produces good progestational activity.

*Example VIII*

Pharmaceutical composition containing a mixture of 17α-acyloxy-pregnenolones in the form of injectable oil solution.

| 1 cc. contains: | Mg. |
|---|---|
| 17α-acetoxy-pregnenolone | 5 |
| 17α-caproxy-pregnenolone | 20 |
| Propyl-paraben, U.S.P. | 1.0 |
| Benzyl alcohol | 110 |
| Sesame oil | 755 |

The method of preparation is the same as described in Example VI. The administration of a single dose of this composition produces a prolonged progestational effect.

I claim:

1. A method of treating domestic animal females to produce progestational and anti-estrogenic effects, which comprises orally administering to a living domestic animal female a pharmaceutical composition containing a pharmaceutical carrier and from 0.5 to 10 mg., approximately per kilogram of body weight, of a compound of the following formula:

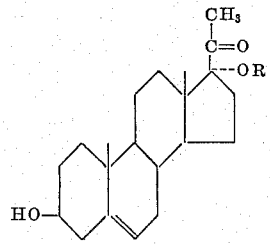

wherein R is a hydrocarbon carboxylic acyl of less than 12 carbon atoms.

2. The method of claim 1 wherein the compound is 17α-acetoxypregnenolone.

3. The method of claim 1 wherein the compound is 17α-caproxy-pregnenolone.

4. A method of treating domestic animal females to produce progestational and anti-estrogenic effects, which comprises parenterally administering to a living domestic animal female a pharmaceutical composition containing a pharmaceutical carrier and from 0.01 to 0.2 mg., approximately, per kilogram of body weight of a compound of the following formula:

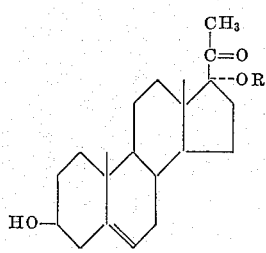

wherein R is hydrocarbon carboxylic acyl of less than 12 carbon atoms.

5. The method of claim 4 wherein the compound is 17α-acetoxy-pregnenolone.

6. The method of claim 4 wherein the compound is 17α-caproxy-pregnenolone.

7. An oral composition in dosage unit form comprising from about 0.5 mg. to 50 mg. of a compound of the following formula:

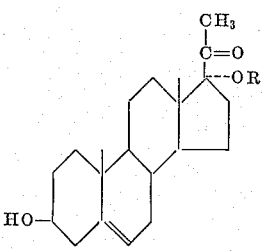

wherein R is a hydrocarbon carboxylic acyl of less than 12 carbon atoms, together with a pharmaceutical carrier.

8. The composition of claim 7 wherein the compound is 17α-acetoxy pregnenolone.

9. The composition of claim 7, wherein the compound is 17α-caproxy pregnenolone.

10. A parenteral composition in dosage unit form comprising from about 0.01 mg. to 10 mg. of a compound of the following formula:

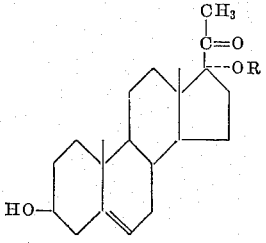

wherein R is hydrocarbon carboxylic acyl of less than 12 carbon atoms, together with a pharmaceutical carrier.

11. The composition of claim 10 wherein the compound is 17α-acetoxy pregnenolone.

12. The composition of claim 10 wherein the compound is 17α-caproxy pregnenolone.

References Cited by the Examiner

UNITED STATES PATENTS

| 2,916,486 | 12/1959 | Babcock et al. | 260—239.55 |
| 2,965,541 | 12/1960 | Byrnes | 167—74 |
| 3,071,603 | 1/1963 | Zaleric et al. | 260—397.4 |

OTHER REFERENCES

Bowers et al.: Journ. Am. Chem. Soc. 81 (22), Nov. 20, 1959, pp. 5991–3.

JULIAN S. LEVITT, *Primary Examiner.*

FRANK CACCIAPAGLIA, L. B. RANDALL,
*Assistant Examiners.*